(12) United States Patent
Vondrell et al.

(10) Patent No.: US 10,807,729 B2
(45) Date of Patent: Oct. 20, 2020

(54) PROPULSION SYSTEM FOR AN AIRCRAFT

(71) Applicant: General Electric Company, Schenectady, NY (US)

(72) Inventors: Randy M. Vondrell, Cincinnati, OH (US); Michael Thomas Gansler, Mason, OH (US); Glenn David Crabtree, Oregonia, OH (US); Konrad Roman Weeber, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/597,571

(22) Filed: May 17, 2017

(65) Prior Publication Data

US 2018/0334258 A1     Nov. 22, 2018

(51) Int. Cl.

| | |
|---|---|
| *B64D 27/24* | (2006.01) |
| *B64D 27/10* | (2006.01) |
| *H02K 1/27* | (2006.01) |
| *H02K 7/18* | (2006.01) |
| *F02K 3/12* | (2006.01) |

(Continued)

(52) U.S. Cl.
CPC .......... *B64D 27/24* (2013.01); *B64D 27/10* (2013.01); *B64D 27/18* (2013.01); *F01D 15/10* (2013.01); *F02K 3/06* (2013.01); *F02K 3/12* (2013.01); *H02K 1/274* (2013.01); *H02K 1/2753* (2013.01); *H02K 3/28* (2013.01); *H02K 7/1823* (2013.01); *H02K 16/04* (2013.01); *H02K 21/14* (2013.01); *B64D 2027/026* (2013.01);

(Continued)

(58) Field of Classification Search
CPC ........ H02K 1/274; H02K 3/28; H02K 1/2726; H02K 16/04; B64D 27/24; B64D 27/10; B64D 27/18; F01D 15/10; F02K 3/06; F02K 3/12
See application file for complete search history.

(56) References Cited

U.S. PATENT DOCUMENTS

| | | |
|---|---|---|
| 4,004,202 A | 1/1977 | Davis |
| 4,025,835 A | 5/1977 | Wada |

(Continued)

FOREIGN PATENT DOCUMENTS

| | | |
|---|---|---|
| CA | 2 767 449 A1 | 8/2012 |
| EP | 1 903 212 A2 | 3/2008 |

(Continued)

OTHER PUBLICATIONS

Extended European Search Report and Opinion issued in connection with corresponding EP Application No. 18171909.7 dated Jul. 10, 2018.

*Primary Examiner* — Viet P Nguyen
(74) *Attorney, Agent, or Firm* — Dority & Manning, P.A.

(57) ABSTRACT

A propulsion system for an includes a combustion engine, a propulsor, and an electric machine configured to either be driven by the combustion engine or configured to drive the propulsor. The electric machine defines an axis. The electric machine includes a rotor extending along and rotatable about the axis, and a stator having a plurality of winding assemblies, the plurality of winding assemblies spaced along the axis of the electric machine, each winding assembly operable with the rotor independently of an adjacent winding assembly during operation of the electric machine.

20 Claims, 7 Drawing Sheets

(51) Int. Cl.
  *F01D 15/10* (2006.01)
  *H02K 16/04* (2006.01)
  *H02K 21/14* (2006.01)
  *B64D 27/18* (2006.01)
  *F02K 3/06* (2006.01)
  *H02K 3/28* (2006.01)
  *H02K 5/173* (2006.01)
  *B64D 27/02* (2006.01)

(52) U.S. Cl.
  CPC ...... *F05D 2220/768* (2013.01); *H02K 5/1732* (2013.01); *H02K 2213/06* (2013.01)

(56) References Cited

U.S. PATENT DOCUMENTS

| | | | |
|---|---|---|---|
| 4,471,246 A | 9/1984 | Paillet | |
| 4,476,395 A * | 10/1984 | Cronin | H02K 16/00 290/4 C |
| 4,480,218 A | 10/1984 | Hair | |
| 4,577,139 A | 3/1986 | Reinhardt et al. | |
| 4,806,812 A | 2/1989 | Masterman | |
| 5,144,180 A * | 9/1992 | Satake | H02K 16/04 310/124 |
| 5,406,190 A * | 4/1995 | Rosenberg | H02P 9/46 322/29 |
| 6,750,586 B2 | 6/2004 | Horng et al. | |
| 7,576,443 B2 * | 8/2009 | Raju | B60L 11/08 290/40 F |
| 8,283,831 B1 * | 10/2012 | Kaminsky | H02K 3/28 310/112 |
| 8,299,638 B2 * | 10/2012 | Sandoy | B63H 23/24 290/4 R |
| 2005/0140241 A1 | 6/2005 | Petersen | |
| 2008/0211336 A1 * | 9/2008 | Sadarangani | H02K 41/031 310/156.02 |
| 2011/0169273 A1 * | 7/2011 | Martin | F03D 9/25 290/1 A |
| 2012/0286523 A1 * | 11/2012 | Hull | H02P 9/48 290/40 A |
| 2015/0144742 A1 * | 5/2015 | Moxon | B64C 11/00 244/215 |
| 2016/0036308 A1 | 2/2016 | Bailey et al. | |
| 2017/0253342 A1 * | 9/2017 | De Magalh es Gomes | B64D 31/10 |
| 2018/0141671 A1 * | 5/2018 | Anghel | B64D 27/24 |

FOREIGN PATENT DOCUMENTS

| | | |
|---|---|---|
| EP | 2 985 901 A1 | 2/2016 |
| EP | 2 995 555 A1 | 3/2016 |
| EP | 3 104 519 A2 | 12/2016 |
| WO | 94/14226 A1 | 6/1994 |
| WO | 96/41411 A1 | 12/1996 |
| WO | 2013/123479 A1 | 8/2013 |
| WO | 2014/192608 A1 | 12/2014 |

* cited by examiner

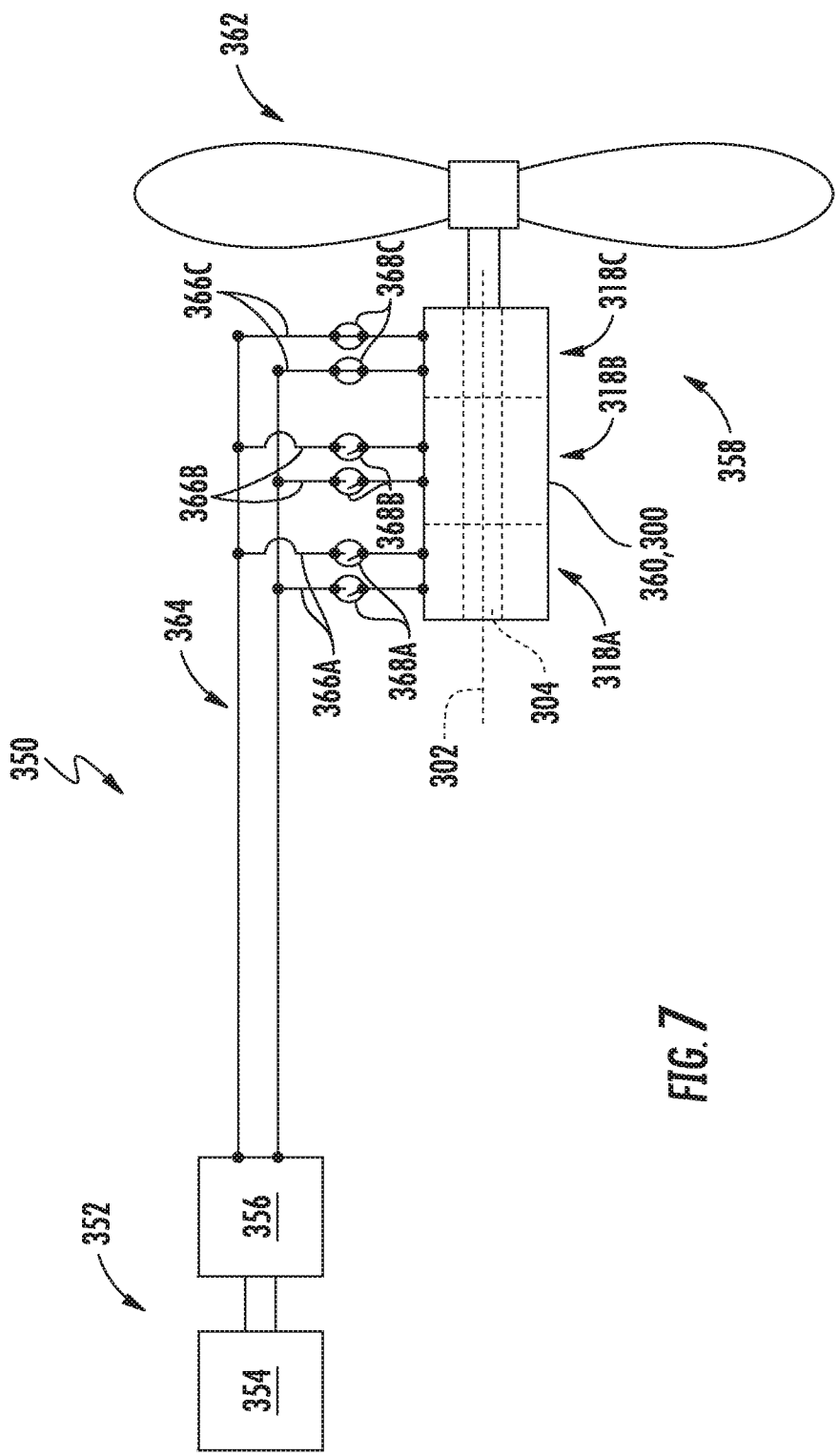

PROPULSION SYSTEM FOR AN AIRCRAFT

FIELD

The present subject matter relates generally to an aircraft propulsion system, and more particularly to the electric machine for the aircraft propulsion system.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage.

More recently, propulsion systems have been proposed of a hybrid-electric design. With these propulsion systems, an electric power source may provide electric power to an electric fan assembly to power the electric fan assembly. The electric fan assembly generally includes an electric motor and a propulsor, such as a fan or propeller. The electric motor may receive the electric power and convert such electric power to mechanical power to drive the propulsor.

In order to ensure a desired level of reliability with the propulsion system, a redundant electric motor may be required, such that in the event of a failure of the main electric motor the aircraft may continue to operate. However, the redundant electric motor may increase a weight and cost of the propulsion system. Accordingly, a propulsion system including an electric machine having backup redundancy without requiring a second electric machine would be useful.

BRIEF DESCRIPTION

Aspects and advantages of the invention will be set forth in part in the following description, or may be obvious from the description, or may be learned through practice of the invention.

In one exemplary embodiment of the present disclosure, a propulsion system for an aircraft is provided. The propulsion system includes a combustion engine, a propulsor, and an electric machine configured to either be driven by the combustion engine or configured to drive the propulsor. The electric machine defines an axis. The electric machine includes a rotor extending along and rotatable about the axis, and a stator having a plurality of winding assemblies, the plurality of winding assemblies spaced along the axis of the electric machine, each winding assembly operable with the rotor independently of an adjacent winding assembly during operation of the electric machine.

In certain exemplary embodiments the plurality of winding assemblies includes a first winding assembly and a second winding assembly spaced along the axis of the electric machine, and wherein the rotor extends continuously between the first winding assembly and the second winding assembly. For example, in certain exemplary embodiments the rotor includes a plurality of permanent magnets, and wherein the plurality of permanent magnets extend continuously between the first winding assembly and the second assembly along the axis.

In certain exemplary embodiments the stator includes at least three winding assemblies and up to thirty winding assemblies.

In certain exemplary embodiments the rotor includes a plurality of permanent magnets.

In certain exemplary embodiments the rotor is positioned inward of the stator.

In certain exemplary embodiments each winding assembly includes a set of windings dedicated to the winding assembly.

In certain exemplary embodiments the electric machine is an electric motor configured to drive the propulsor, wherein the propulsion system further includes an electric generator configured to be driven by the aeronautical combustion engine, and wherein the electric generator is electrically coupled to the electric motor.

In certain exemplary embodiments the propulsion system further includes an electric power bus, wherein the plurality of winding assemblies are separately in electrical communication with the electric power bus. For example, in certain exemplary embodiments the plurality of winding assemblies are separately in parallel electrical communication with the electric power bus. For example, in certain exemplary embodiments one or more of the plurality of winding assemblies are selectively in electrical communication with the electric power bus.

In certain exemplary embodiments the electric machine includes a housing, wherein the rotor and stator are each positioned within the housing.

In another exemplary embodiment of the present disclosure, a propulsion system for an aircraft is provided. The propulsion system includes an electric power source including a combustion engine and an electric generator powered by the combustion engine. The propulsion system also includes an electric propulsor assembly including a propulsor and an electric motor configured to drive the propulsor. The electric motor defines an axis and includes a rotor extending along and rotatable about the axis, and a stator including a plurality of winding assemblies. The plurality of winding assemblies are spaced along the axis of the electric motor, each winding assembly operable with the rotor independently of an adjacent winding assembly during operation of the electric motor.

In certain exemplary embodiments the propulsion system further including an electric power bus, wherein the plurality of winding assemblies are separately in electrical communication with the electric power bus.

In certain exemplary embodiments the plurality of winding assemblies are separately in parallel electrical communication with the electric power bus.

In certain exemplary embodiments one or more of the plurality of winding assemblies are selectively in electrical communication with the electric power bus.

In certain exemplary embodiments the electric motor includes a housing, wherein the rotor and stator are each positioned within the housing.

In certain exemplary embodiments the stator includes at least three winding assemblies and up to thirty winding assemblies.

In yet another exemplary embodiment of the present disclosure, an electric machine is provided. The electric machine includes a rotor extending along and rotatable about the axis of the electric machine, and a stator having a plurality of winding assemblies. The plurality of winding assemblies are spaced along the axis of the electric machine, each winding assembly operable with the rotor independently of adjacent winding assembly during operation of the electric machine.

In certain exemplary embodiments the stator includes at least three winding assemblies and up to thirty winding assemblies.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7 is a schematic view of a propulsion system in accordance with another exemplary embodiment of the present disclosure.

DETAILED DESCRIPTION

Figure 1:
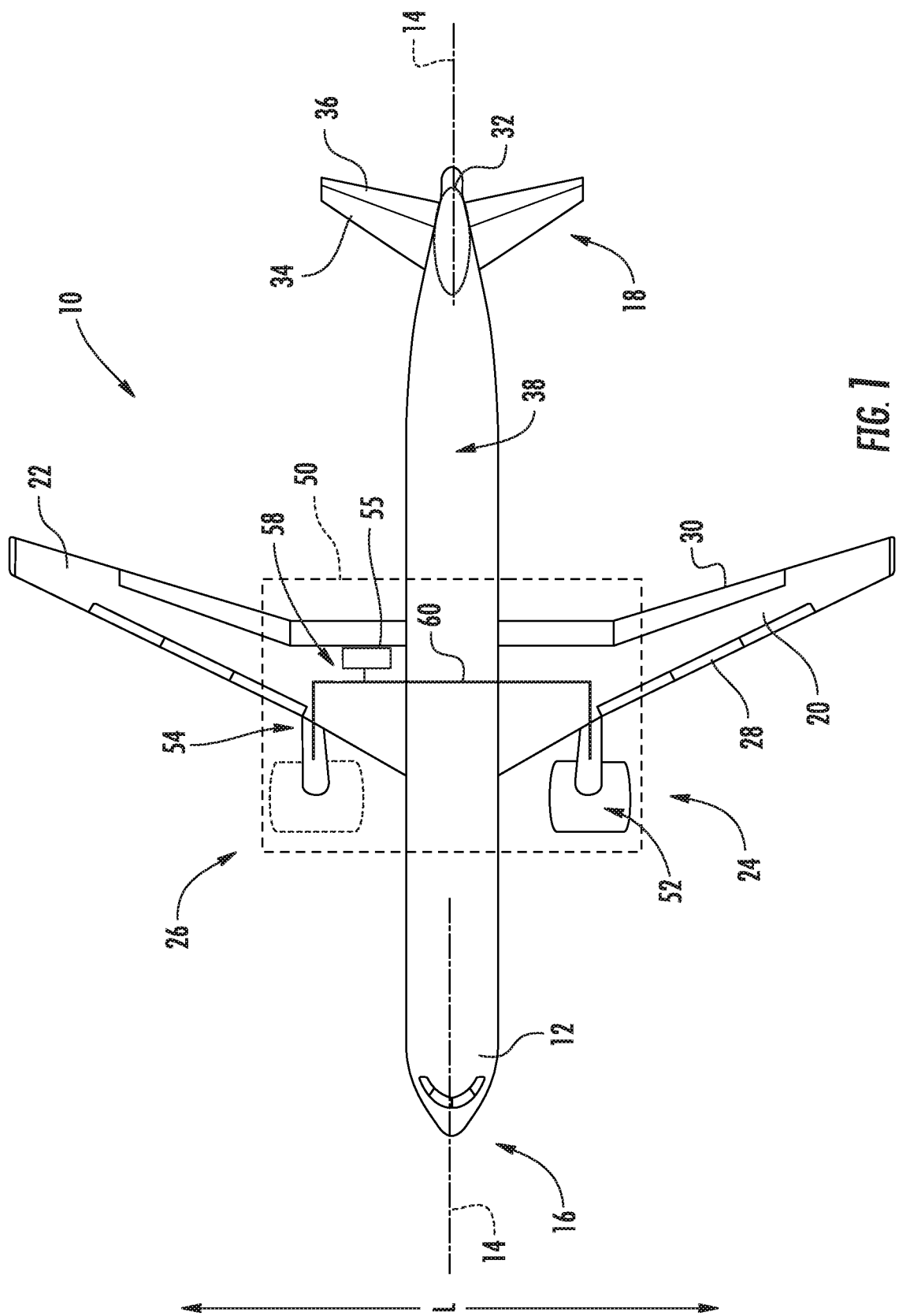
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and a wing assembly including a port side and a starboard side. More specifically, the port side of the wing assembly is a first, port side wing 20, and the starboard side of the wing assembly is a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
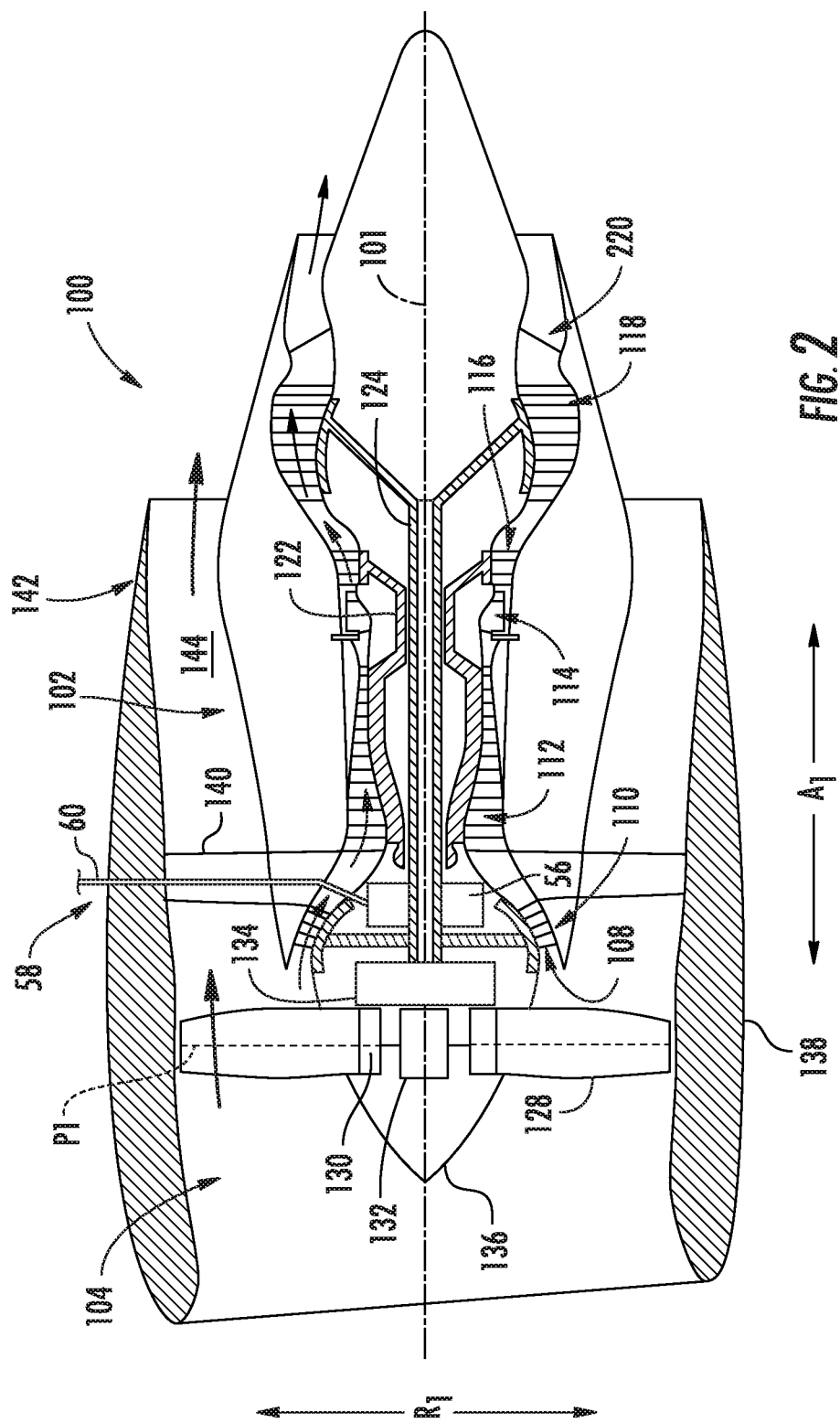
FIG. 2 is a schematic, cross-sectional view of a gas turbine engine mounted to the exemplary aircraft of FIG. 1.
Figure 3:
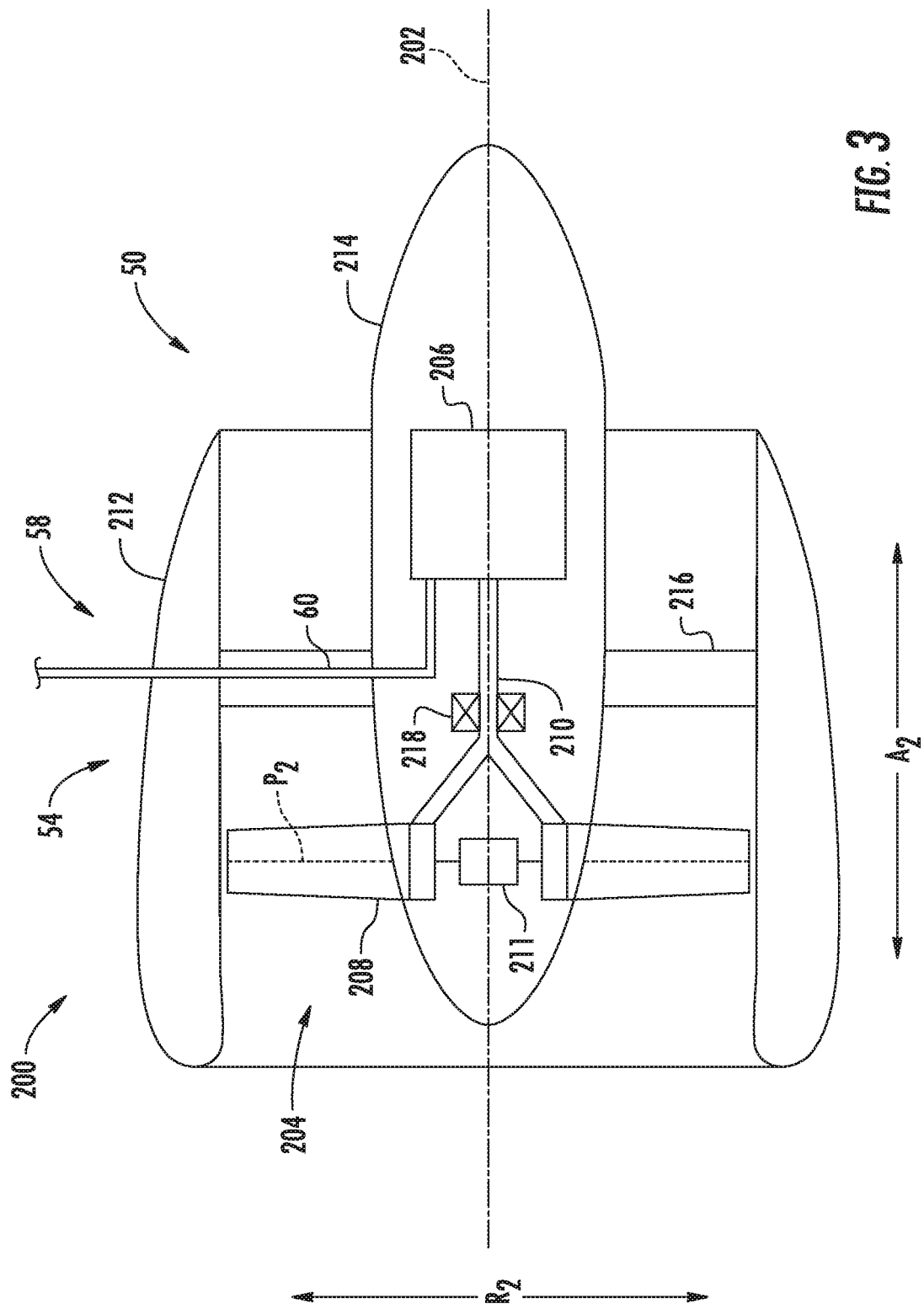
FIG. 3 is a schematic, cross-sectional view of an electric fan assembly in accordance with an exemplary embodiment of the present disclosure.

Referring now also to FIGS. 2 and 3, the exemplary aircraft 10 of FIG. 1 additionally includes a propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. As is depicted, each of the first propulsor assembly 52 and second propulsor assembly 54 are configured as under-wing mounted propulsor assemblies.

Referring particularly to FIGS. 1 and 2, the first propulsor assembly 52 is mounted, or configured to be mounted, to the first side 24 of the aircraft 10, or more particularly, to the first wing 20 of the aircraft 10. The first propulsor assembly 52 generally includes a turbomachine 102 and a primary fan (referred to simply as "fan 104" with reference to FIG. 2).

More specifically, for the embodiment depicted the first propulsor assembly 52 is configured as a turbofan engine 100 (i.e., the turbomachine 102 and the fan 104 are configured as part of the turbofan 100).

As shown in FIG. 2, the turbofan 100 defines an axial direction A1 (extending parallel to a longitudinal centerline 101 provided for reference) and a radial direction R1. As stated, the turbofan 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, low pressure (LP) turbine 118 and a second, high pressure (HP) turbine 116; and a jet exhaust nozzle section 120.

The exemplary turbomachine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the first, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the turbomachine 102. Accordingly, the exemplary turbofan 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the propulsion system 50 additionally includes an electric machine, which for the embodiment depicted is configured as an electric generator 56. The electric generator 56 and turbofan engine 100 may generally be referred to herein as an electric power source of the propulsion system 50. Additionally, the electric generator 56 is, for the embodiment depicted, positioned within the turbomachine 102 of the turbofan engine 100 and is in mechanical communication with one of the shafts of the turbofan engine 100. More specifically, for the embodiment depicted, the electric generator is driven by the first, LP turbine 118 through the LP shaft 124. The electric generator 56 is configured to convert mechanical power of the LP shaft 124 to electric power. Accordingly, the electric generator 56 is also powered by the LP system (including the LP turbine 118) of the turbomachine 102.

It should be appreciated, however, that in other exemplary embodiments, the electric generator 56 may instead be positioned at any other suitable location within the turbomachine 102 or elsewhere, and may be, e.g., powered in any other suitable manner. For example, the electric generator 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric generator 56 may instead be powered by the HP system, i.e., by the HP turbine 116 through the HP shaft 122, or by both the LP system (e.g., the LP shaft 124) and the HP system (e.g., the HP shaft 122) via a dual drive system.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the first propulsor assembly 52 may include any other suitable type of engine. For example, in other embodiments, the turbofan engine 100 may instead be configured as a turboprop engine or an unducted turbofan engine. Additionally, however, in other embodiments, the turbofan engine 100 may instead be configured as any other suitable combustion engine for driving the electric generator 56. For example, in other embodiments, the turbofan engine may be configured as a turboshaft engine, or any other suitable combustion engine.

Referring still to FIGS. 1 and 2, the propulsion system 50 depicted additionally includes an electrical power bus 58 to allow the electric generator 56 to be in electrical communication with one or more other components of the propulsion system 50 and/or the aircraft 10. For the embodiment depicted, the electrical power bus 58 includes one or more electrical cables or lines 60 connected to the electric generator 56, and for the embodiment depicted, extending through one or more of the outlet guide vanes 140.

Additionally, the propulsion system 50 depicted further includes one or more energy storage devices 55 (such as one or more batteries or other electrical energy storage devices) electrically connected to the electrical power bus 58 for, e.g., providing electrical power to the second propulsor assembly 54 and/or receiving electrical power from the electric generator 56. Inclusion of the one or more energy storage devices 55 may provide performance gains, and may increase a propulsion capability of the propulsion system 50 during, e.g., transient operations. More specifically, the propulsion system 50 including one or more energy storage devices 55 may be capable of responding more rapidly to speed change demands.

Referring now particularly to FIGS. 1 and 3, the exemplary propulsion system 50 additionally includes the second propulsor assembly 54 positioned, or configured to be positioned, at a location spaced apart from the first propulsor assembly 52. More specifically, for the embodiment depicted, the second propulsor assembly 54 is mounted at a location away from the first propulsor assembly 52 along the lateral direction L such that they ingest different airstreams along the lateral direction L. However, in other embodiments, the first and second propulsor assemblies 52, 54 may each be mounted to the aircraft 10 using a common mount. With such a configuration, however, the first and second propulsor assemblies 52, 54 may still be positioned on the mount in a manner such that they are spaced apart from one another, e.g., along the lateral direction L such that they ingest different airstreams along the lateral direction L.

Referring still to the exemplary embodiment of FIGS. 1 and 3, the second propulsor assembly 54 is mounted to the second side 26 of the aircraft 10, or rather to the second wing 22 of the aircraft 10. Referring particularly to FIG. 3, the second propulsor assembly 54 is generally configured as an electric propulsion assembly including an electric motor and a propulsor. More particularly, for the embodiment depicted, the electric propulsion assembly includes an electric fan 200, the electric fan including an electric motor 206 and a propulsor/fan 204. The electric fan 200 defines an axial direction A2 extending along a longitudinal centerline axis 202 that extends therethrough for reference, as well as a radial direction R2. For the embodiment depicted, the fan 204 is rotatable about the centerline axis 202 by the electric motor 206.

The fan 204 includes a plurality of fan blades 208 and a fan shaft 210. The plurality of fan blades 208 are attached to/rotatable with the fan shaft 210 and spaced generally along a circumferential direction of the electric fan 200 (not shown). In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric fan 200 depicted additionally includes a fan casing or outer nacelle 212, attached to a core 214 of the electric fan 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric fan 200 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor).

As briefly noted above, the electric power source (i.e., the electric generator 56 and the first propulsor assembly 52 for the embodiment depicted) is electrically connected with the electric propulsion assembly (i.e., the electric motor 206 and the fan 204 of the electric fan 200 for the embodiment depicted) for providing electrical power to the electric propulsion assembly. More particularly, the electric motor 206 of the electric fan 200 is in electrical communication with the electric generator 56 through the electrical power bus 58, and more particularly through the one or more electrical cables or lines 60 extending therebetween.

A propulsion system in accordance with one or more of the above embodiments may be referred to as a gas-electric, or hybrid, propulsion system, given that a first propulsor assembly is configured as a turbofan engine mounted to a first side of an aircraft and a second propulsor assembly is configured as an electrically driven fan mounted to a second side of the aircraft.

It should be appreciated, however, that in other exemplary embodiments the exemplary propulsion system may have any other suitable configuration, and further, may be integrated into an aircraft 10 in any other suitable manner. For example, in other exemplary embodiments, the propulsion system may include a plurality of electric fans. One or more of these electric fans may be mounted to the wings, of the stabilizers, or to the fuselage, e.g., at an aft end of the aircraft. Other embodiments are contemplated as well.

Figure 4:
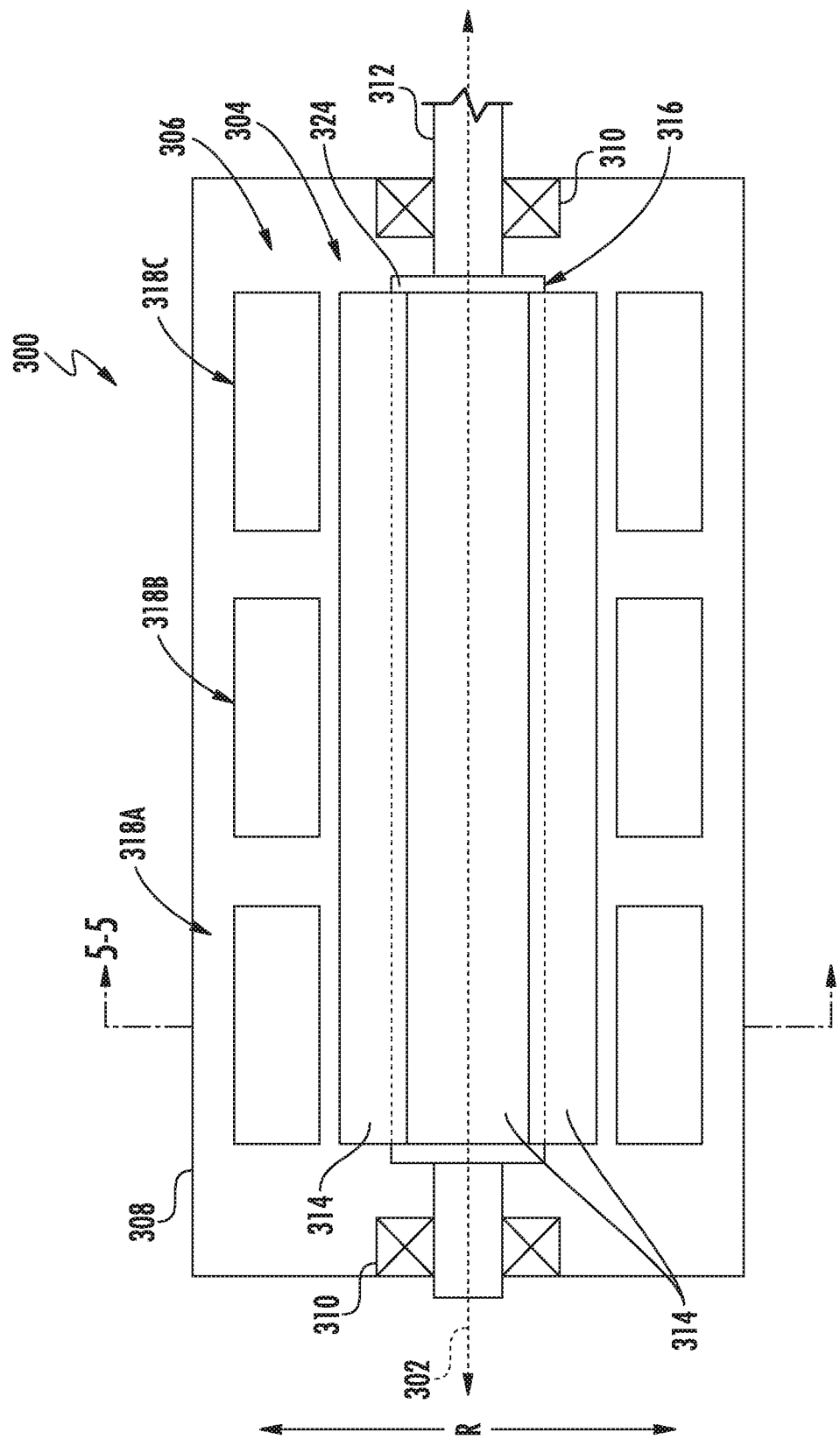
FIG. 4 is a side, cross-sectional view of an electric machine in accordance with an exemplary embodiment of the present disclosure.
Figure 5:
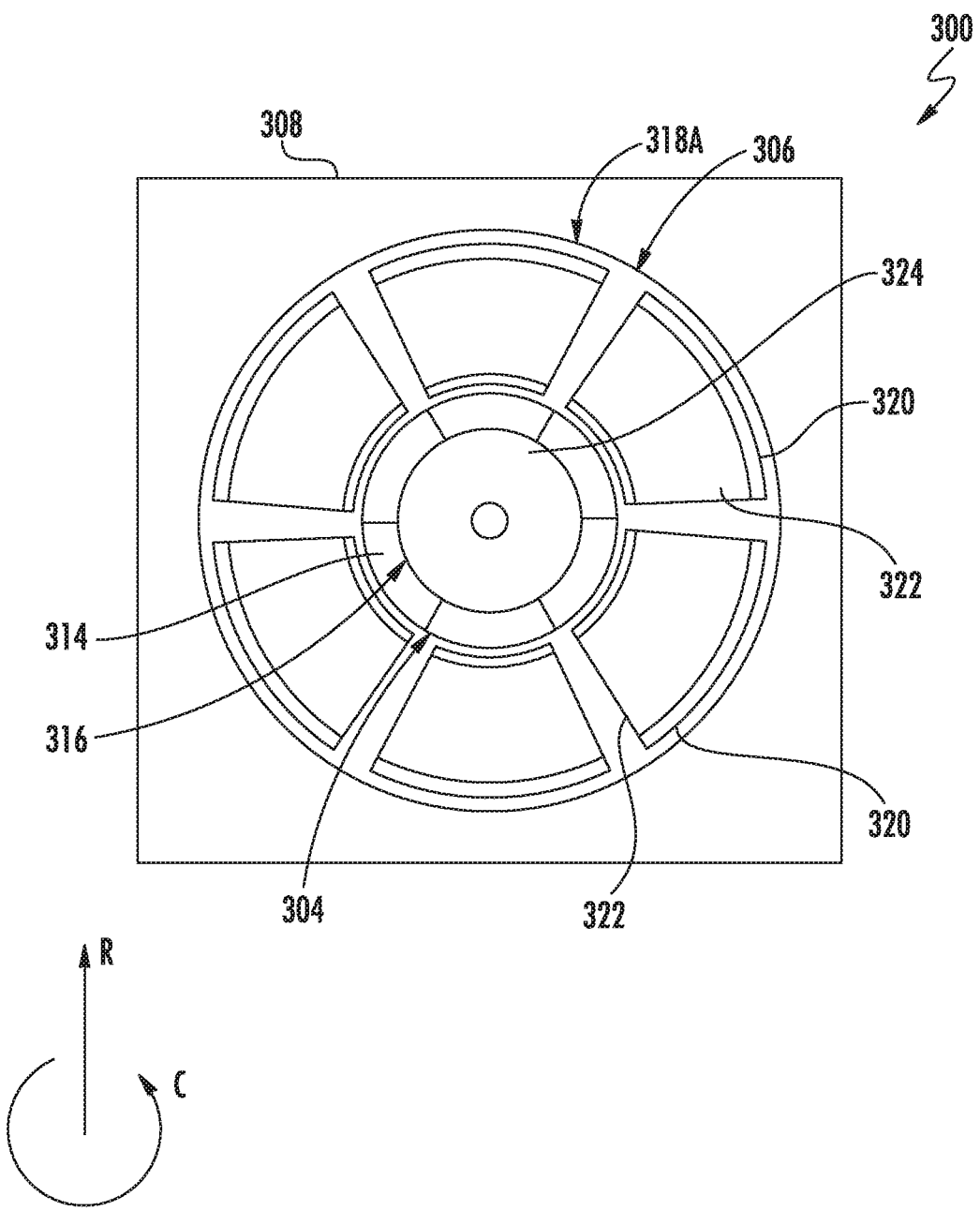
FIG. 5 is an axial, cross-sectional view of the exemplary electric machine of FIG. 4.

Referring now to FIGS. 4 and 5, an electric machine 300 in accordance with an exemplary embodiment of disclosure is provided. Specifically, FIG. 4 provides a side, schematic, cross-sectional view of the exemplary electric machine 300; and FIG. 5 provides an axial, schematic, cross-sectional view of the electric machine 300. In certain exemplary embodiments, the electric machine 300 depicted may be configured as an electric generator, such as the electric generator 56 described above with reference to FIG. 2. With such an exemplary embodiment, the electric machine 300 may therefore be configured to be driven by an aeronautical combustion engine, such as the exemplary turbofan engine 100 of FIG. 2. Alternatively, however, it should be appreciated that in other exemplary embodiments, the electric machine 300 may instead be configured as an electric motor, such as the exemplary electric motor 206 described above with reference to FIG. 3. Accordingly, with such an exemplary embodiment the electric machine 300 may be configured as part of an electric propulsor assembly 358, and further may be configured to drive a propulsor of the electric propulsor assembly 358, such as the exemplary fan 204 described above with reference to FIG. 3.

As is depicted, the electric machine 300 generally defines a longitudinal centerline axis 302, a radial direction R3 relative to the longitudinal centerline axis 302, and a circumferential direction C3 extending about the longitudinal centerline axis 302 (see, e.g., FIG. 5). Additionally, the electric machine 300 includes a rotor 304 and a stator 306, with the rotor 304 extending along, and rotatable about, the longitudinal centerline axis 302, i.e., in the circumferential direction C3. For the embodiment depicted, the rotor 304 is positioned inward of the stator 306 along the radial direction R3, such that the electric machine 300 may generally be referred to as an "in-runner" electric machine 300. It will be appreciated, however, that in other exemplary embodiments, the stator 306 may instead be positioned inward of the rotor 304 along the radial direction R, such that the electric machine 300 may instead be referred to as an "out-runner" electric machine 300.

The rotor 304 and stator 306 of the electric machine 300 are enclosed within a housing 308. Additionally, for the embodiment depicted the rotor 304 is rotatably mounted within the housing 308 using a plurality of bearing assemblies 310. The plurality of bearing assemblies 310 may include, e.g., roller bearings, ball bearings, or any other suitable type of bearings. As is also shown, for the embodiment depicted the rotor 304 is formed integrally with a driveshaft 312 extending outward from the housing 308 of the electric machine 300. The driveshaft 312 may be coupled to, e.g., a propulsor when utilized as an electric motor, or an aeronautical combustion engine when utilized as an electric generator.

It will be appreciated that for the embodiment depicted the rotor 304 is configured as a permanent magnet rotor including a plurality of permanent magnets 314. More specifically, the rotor 304 is configured as a surface permanent magnet rotor, with the plurality of permanent magnets 314 positioned on a radially outer surface 316 of the rotor 304. It should be appreciated, however, that in other exemplary embodiments the rotor 304 may instead include interior permanent magnets 314 (i.e., permanent magnets recessed from the radially outer surface 316 of the rotor 304). Additionally, or alternatively, in other embodiments, the rotor 304 may utilize electromagnets.

As is also depicted, the stator 306 of the electric machine 300 further includes a plurality of winding assemblies 318. The plurality winding assemblies 318 are spaced along the longitudinal centerline axis 302 of the electric machine 300, with each winding assembly 318 operable with the rotor 304 independently of an adjacent winding assembly 318 during operation of the electric machine 300. For example, in certain embodiments, the stator 306 may include between two winding assemblies 318 and up to, e.g., about thirty winding assemblies 318. For example, in certain exemplary embodiments, the stator 306 may include at least three winding assemblies 318. More specifically, for the embodiment depicted, the stator 306 includes a first winding assembly 318A, a second winding assembly 318B, and a third winding assembly 318C spaced along the longitudinal centerline axis 302 of the electric machine 300.

Referring particularly to FIG. 5, providing a cross-sectional view of the exemplary electric machine 300 along Line 5-5 of FIG. 4, the first winding assembly 318A is shown in greater detail. As is depicted, the first winding assembly 318A of the stator 306 includes a plurality of teeth 320 with windings 322 attached thereto. The windings 322 may each be formed of a length of electrical line wrapped around a respective tooth 320. Accordingly, as will be appreciated, the first winding assembly 318A includes a set of windings 322 dedicated to the first winding assembly 318A. As used herein, "dedicated" with reference to the windings 332 refers to the windings 322 of one winding assembly 318 not being directly electrically connected to a winding 322 of another, separate winding assembly 318. Additionally, when utilized as an electric generator, it will be appreciated that the mechanical rotation of the plurality of permanent magnets 314 of the rotor 304 creates a movement of electric charges present in the wire of its windings 322 constituting an electrical power outlet. By contrast, when utilized as an electric motor, it will be appreciated that the electrical charge through the windings 322 creates a movement of the permanent magnets 314 of the rotor 304, creating movement of the rotor 304.

Additionally, referring now particularly to FIG. 4, it will be appreciated that for the embodiment depicted the rotor 304 extends continuously between the first winding assembly 318A, the second winding assembly 318B, and the third winding assembly 318C. For example, the exemplary rotor 304 depicted includes a core 324 (the core 324 defining the outer surface 316; also shown in phantom beneath the permanent magnets 314) extending continuously between the plurality winding assemblies 318. Additionally, the exemplary rotor 304 depicted for the embodiment of FIG. 4, the plurality of permanent magnets 314 additionally extend continuously between the plurality of winding assemblies 318. Notably, however, in other embodiments, the rotor 304 may instead include separate permanent magnets 314 for each of the respective winding assemblies 318 of the stator 306.

It should be appreciated, however, that in other exemplary embodiments, the propulsion system 300 may have any other suitable configuration. For example, in other exemplary embodiments, the propulsion system 300 may be configured to generate direct current (DC) electrical power or alternating current (AC) electrical power (e.g., such as two-phase electrical power or three-phase electrical power). Additionally, or alternatively, the propulsion system 300 may be configured as a synchronous electric machine or as an asynchronous electric machine, and further may be a permanent magnet electric machine (as shown) or an electromagnetic electric machine.

Figure 6:
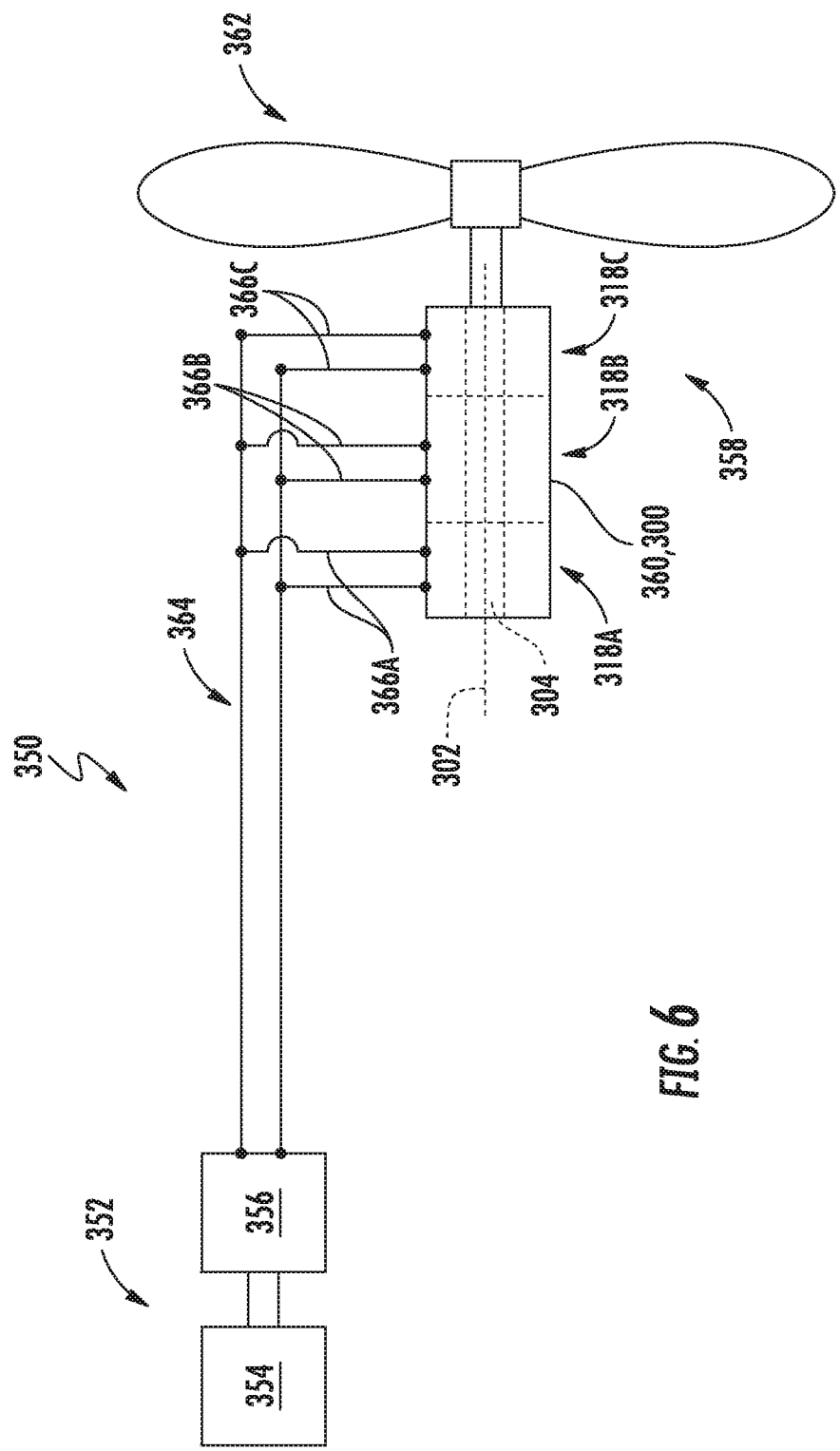
FIG. 6 is a schematic view of a propulsion system in accordance with an exemplary embodiment of the present disclosure.

Referring now to FIG. 6, a schematic view of a propulsion assembly 300 in accordance with an exemplary embodiment of the present disclosure is provided. The exemplary propulsion system 350 depicted schematically in FIG. 6 may be configured in substantially the same manner as exemplary propulsion system 50 described above with reference to FIGS. 1 through 3. For example, the exemplary propulsion system 350 generally includes the electric power source 352 including a combustion engine 354 (e.g., a gas turbine engine such as a turbofan engine, turboshaft engine, turboprop engine, etc.) and an electric generator 356 being driven by the combustion engine 354. The exemplary propulsion system 350 additionally includes an electric propulsor assembly 358 including an electric motor 360 and a fan 362 being driven by the electric motor 360. The electric motor 360 of the electric propulsor assembly 358 is electrically coupled to the electric generator 356 of the electric power source 352. More specifically, the exemplary propulsion system 350 includes an electric power bus 364 electrically connecting the electric generator 356 of the electric power source 352 to the electric motor 360 of the electric propulsor assembly 358.

Additionally, the propulsion system 350 of FIG. 6 includes an electric machine 300 configured in accordance with an embodiment of the present disclosure. More specifically, the electric machine 300 is configured as the electric motor 360 of the electric propulsor assembly 358. As with the exemplary electric machine 300 described above with reference to FIGS. 4 and 5, the exemplary electric motor 360 includes a rotor 304 rotatable about a longitudinal centerline axis 302 and a stator 306 having a plurality of winding assemblies 318. More particularly, for the embodiment of FIG. 6, the stator 306 of the electric motor 360 includes a first winding assembly 318A, a second winding assembly 318B, and the third winding assembly 318C.

In addition, for the embodiment of FIG. 6, each of the plurality of winding assemblies 318 of the stator 306 of the electric motor 360 is separately in electrical communication with the electric power bus 364. For the embodiment depicted, each of the winding assemblies 318 of the stator 306 of the electric motor 360 is separately electrically connected to the electric power bus 364 in parallel using respective electrical lines. More particularly, the first winding assembly 318A is electrically connected to the electric power bus 364 through a first set of lead lines 366A, the second winding assembly 318B is electrically connected to the electric power bus through a second set of lead lines 366B, and the third winding assembly 318C is electrically connected to the electric power bus through a third set of lead lines 366C. Accordingly, in the event of a failure of one of the plurality of winding assemblies 318 (such as a short in one of the windings 322), the remaining winding assemblies 318 may continue to operate to provide at least a portion of a desired power to the fan 362 of the electric propulsor assembly 358.

With such a configuration, the electric machine 300 may generally operate as a plurality of separate electric machines 300 utilizing a common housing 308, rotor 304, etc. Accordingly, such a configuration may provide for an additional layer of redundancy, without the added weight and/or cost of including multiple, separate electric machines 300.

It should be appreciated, however, that in other exemplary embodiments, the propulsion system 350 may have any other suitable configuration. For example, in other exemplary embodiments, the electric generator 356 may additionally, or alternatively, be configured in accordance with an exemplary embodiment of the present disclosure to include a stator 306 having a plurality of winding assemblies 318. Further, the propulsion system 350 may have any suitable configuration, as may the electric power bus 364.

Additionally, in still other embodiments, the electric power bus 364 may be electrically connected to one or more of the electric machines 300 in any other suitable manner. For example, referring now to FIG. 7, a propulsion system 350 in accordance with another exemplary embodiment of the present disclosure is depicted. The exemplary propulsion system 350 of FIG. 7 is configured in substantially the same manner as the propulsion system 350 described above with reference to FIG. 6.

For example, the exemplary propulsion system 350 of FIG. 7 generally includes an electric power source 352 having a combustion engine 354 and an electric generator 356, an electric propulsion system 350 having an electric motor 360 and a fan 362, and an electric power bus 364 electrically connecting the electric generator 356 of the electric power source 352 to the electric motor 360 of the electric propulsor assembly 358. Additionally, with the embodiment of FIG. 7, the electric motor 360 is configured in accordance with an embodiment of the present disclosure. More specifically, the electric motor 360 includes a rotor 304 and a stator 306, with the stator 306 including a plurality of winding assemblies 318 (i.e., for the embodiment depicted, a first, second, and third winding assembly 318A, 318B, 318C). Further, for the embodiment depicted, the plurality of winding assemblies 318A, 318B, 318C are separately in electrical communication with the electric power bus 364 through respective lead lines 366A, 366B, 366C.

However, for the embodiment depicted, one or more of the plurality of winding assemblies 318A, 318B, 318C are selectively in electrical communication with the electric power bus 364. More specifically, for the embodiment of FIG. 7 each of the plurality winding assemblies 318A, 318B, 318C are selectively in electrical communication with the electric power bus 364. For example, for the embodiment depicted a plurality of switches 368 are provided with the lead lines 366 to selectively electrically connect a particular winding assembly 318A, 318B, 318C of the stator 306 of the electric motor 360 to the electric power bus 364. For example, a first pair of switches 368A are provided with the lead lines 366A to electrically connect the first winding assembly 318A of the stator 306 to the electric power bus 364, a second pair of switches 368B are provided with the lead lines 366B to electrically connect the second winding assembly 318B of the stator 306 to the electric power bus 364, and a third pair of switches 368C are provided with the lead lines 366C to electrically connect the third winding assembly 318C of the stator 306 to the electric power bus 364. Each of these switches 368A, 368B, 368C are movable between a connected position, in which electrical flow may pass therethrough, and a disconnected position, in which an electrical flow may not pass therethrough. For the embodiment depicted, the first pair of switches 368A and second pair of switches 368B are shown in the disconnected position, while the third pair switches 368C are shown in the connected position. Accordingly, in the embodiment of FIG. 7, the first and second winding assemblies 318A, 318B may not receive electrical power from the electric power bus 364, while the third winding assembly 318C may receive electrical power from the electric power bus 364.

It will be appreciated that such a configuration may allow for selective operation of one or more winding assemblies 318 of the electric machine 300, e.g., during a failure of one of the winding assemblies 318, or during an operation mode that uses less electrical power than the electric machine 300 generates or needs. Accordingly, in the latter situation, a temperature of the electric machine 300 may be reduced during operation modes requiring less electrical power.

Further, it will be appreciated that although the exemplary electric machine is discussed in the context of a propulsion system, and more specifically an aircraft propulsion system, in other embodiments, the electric machine may be utilized for any other suitable purpose. For example, in other embodiments, the electric machine may be an electric motor (or generator) in any other suitable vehicle, such as an automobile, aeronautical vehicle, etc. Further, still, in other embodiments, the electric machine may be utilized in other fields, such as industrial or other fields.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft comprising:
   an aircraft propulsion system comprising a combustion engine, a propulsor, and an electric machine including a generator configured to be driven by the combustion engine and a motor electrically coupled with the generator and configured to drive the propulsor, wherein the combustion engine and the propulsor are mounted on opposing sides of a fuselage, the motor further defining an axis and comprising:
   a rotor extending along and rotatable about the axis;
   a stator comprising a plurality of winding assemblies, the plurality of winding assemblies spaced along the axis of the motor, each winding assembly operable with the rotor independently of an adjacent winding assembly during operation of the motor, wherein the plurality of winding assemblies includes a first winding assembly and a second winding assembly spaced along the axis of the motor; and an electric power bus, wherein the plurality of winding assemblies are separately in electrical communication with the electric power bus;

wherein the aircraft is configured for operating the motor with less than all of the plurality of winding assemblies in the event of a failure of one of the plurality of winding assemblies.

2. The aircraft of claim 1, wherein the stator comprises at least three winding assemblies and up to thirty winding assemblies.

3. The aircraft of claim 1, wherein the rotor is positioned inward of the stator.

4. The aircraft of claim 1, wherein each winding assembly comprises a set of windings dedicated to the winding assembly.

5. The aircraft of claim 1, wherein the combustion engine is an aeronautical combustion engine.

6. The aircraft of claim 1, wherein the plurality of winding assemblies are separately in parallel electrical communication with the electric power bus.

7. The aircraft of claim 1, wherein one or more of the plurality of winding assemblies are selectively in electrical communication with the electric power bus.

8. The aircraft of claim 1, wherein the motor comprises a housing, wherein the rotor and stator are each positioned within the housing.

9. The aircraft of claim 1, wherein the aircraft is configured to selectively disconnect at least one winding assembly of the plurality of winding assemblies of the motor during a failure of the at least one winding assembly, during a low power operation mode, or both.

10. The aircraft of claim 1, wherein the aircraft is configured for selectively operating at least one winding assembly of the plurality of winding assemblies of the motor during a failure of one or more of the other winding assemblies, during an operation mode that uses less electrical power than the motor is capable of generating or needs, or both.

11. The aircraft of claim 1, wherein the first winding assembly has an axial width that is different than an axial width of the second winding assembly.

12. The aircraft of claim 1, wherein the propulsor includes a variable pitch fan having a pitch change mechanism that is configured to alter a pitch of each of a plurality of fan blades of the variable pitch fan.

13. The aircraft of claim 1, wherein the rotor includes a motor core extending axially outward of the plurality of permanent magnets.

14. The aircraft of claim 1, wherein the rotor, the stator, and at least one bearing are all enclosed within a common housing.

15. An aircraft comprising:
an aircraft propulsion system comprising an electric power source comprising a combustion engine and an electric generator powered by the combustion engine, the aircraft propulsion system further comprising an electric propulsor assembly comprising a propulsor and an electric motor electrically coupled with the generator and configured to drive the propulsor, wherein the combustion engine and the propulsor are mounted on separate wings, the electric motor defining an axis and comprising:

a rotor extending along and rotatable about the axis;
a stator comprising a plurality of winding assemblies, the plurality of winding assemblies spaced along the axis of the electric motor, each winding assembly operable with the rotor independently of an adjacent winding assembly during operation of the electric motor, wherein the plurality of winding assemblies includes a first winding assembly and a second winding assembly spaced along the axis of the motor, and wherein the rotor comprises a plurality of permanent magnets, and wherein the plurality of permanent magnets extend continuously between the first winding assembly and the second assembly along the axis; and an electric power bus, wherein the plurality of winding assemblies are separately in electrical communication with the electric power bus, and wherein the aircraft is configured for operating the motor with less than all of the plurality of winding assemblies in the event of a failure of one of the plurality of winding assemblies.

16. The aircraft of claim 15, wherein one or more of the plurality of winding assemblies are selectively in electrical communication with the electric power bus.

17. The aircraft of claim 15, wherein the electric motor comprises a housing, wherein the rotor and stator are each positioned within the housing.

18. The aircraft of claim 15, wherein the stator comprises at least three winding assemblies and up to thirty winding assemblies.

19. A propulsion system comprising:
a combustion engine mounted to a first wing,
a propulsor mounted to a second wing;
an electric power bus; and
an electric machine including a generator mechanically coupled with the combustion engine and a motor electrically coupled with the propulsor, the motor electrically coupled with the generator and configured to drive the propulsor through the electric power bus, the motor defining an axis and comprising:
a rotor extending along and rotatable about the axis; and
a stator comprising a first winding assembly and a second winding assembly, the first and second winding assemblies spaced along the axis of the motor and independently operable with the rotor during operation of the motor, wherein the plurality of winding assemblies includes a first winding assembly and a second winding assembly spaced along the axis of the motor, and wherein the rotor comprises a plurality of permanent magnets, and wherein the;

wherein the first and second winding assemblies are separately in electrical communication with the electric power bus, and wherein the first winding assembly is selectively in electrical communication with the electric power bus for operating the motor with the second winding assembly and without the first winding assembly during a failure of the first winding assembly and during a low power operation mode.

20. The aircraft of claim 19, wherein the first winding assembly has an axial width that is different than an axial width of the second winding assembly.

* * * * *